(12) United States Patent
Zhao et al.

(10) Patent No.: US 12,099,922 B2
(45) Date of Patent: Sep. 24, 2024

(54) DETECTION OF OPERATION TENDENCY BASED ON ANOMALY DETECTION

(71) Applicant: INTERNATIONAL BUSINESS MACHINES CORPORATION, Armonk, NY (US)

(72) Inventors: Kun Zhao, Funabashi (JP); Takayuki Katsuki, Tokyo (JP); Takayuki Yoshizumi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1206 days.

(21) Appl. No.: 16/426,763

(22) Filed: May 30, 2019

(65) Prior Publication Data
US 2020/0380354 A1     Dec. 3, 2020

(51) Int. Cl.
*G06N 3/08*     (2023.01)
*G06N 5/04*     (2023.01)

(52) U.S. Cl.
CPC ............... *G06N 3/08* (2013.01); *G06N 5/04* (2013.01)

(58) Field of Classification Search
CPC .................................. G07C 5/02; G06N 3/08
See application file for complete search history.

(56) References Cited

U.S. PATENT DOCUMENTS

| 9,827,992 | B2 | 11/2017 | Prakah-Asante et al. |
| 11,195,116 | B2 * | 12/2021 | Harry Putra ........... G06N 20/00 |

| 2009/0040054 | A1 | 2/2009 | Wang et al. |
| 2015/0116125 | A1 | 4/2015 | Armstrong et al. |
| 2015/0119732 | A1 | 4/2015 | Wisbey et al. |
| 2015/0235485 | A1 | 8/2015 | Nemat-Nasser et al. |
| 2016/0352766 | A1 * | 12/2016 | Flacher ................... H04L 12/28 |
| 2016/0375908 | A1 | 12/2016 | Biemer |
| 2017/0001520 | A1 | 1/2017 | Nemat-Nasser |
| 2017/0147935 | A1 | 5/2017 | Bai et al. |

(Continued)

FOREIGN PATENT DOCUMENTS

| CN | 105030257 A | 11/2015 |
| CN | 105741494 A | 7/2016 |
| CN | 108846308 A | 11/2018 |

OTHER PUBLICATIONS

Takayuki Osogami, Boltzmann machines for time-series, Jan. 18, 2019, Proquest, p. 30. (Year: 2019).*

(Continued)

*Primary Examiner* — Michael J Huntley
*Assistant Examiner* — Imad Kassim
(74) *Attorney, Agent, or Firm* — Tutunjian & Bitetto, P.C.; Anthony Mauricio Pallone

(57) ABSTRACT

A computer-implemented method for detecting an operation tendency is disclosed. The method includes preparing a general model for generating a general anomaly score. The method also includes preparing a specific model, for generating a specific anomaly score, trained with a set of a plurality of operation data related to operation by a target operator. The method further includes receiving input operation data. The method includes also calculating a detection score related to the operation tendency by using a general anomaly score and a specific anomaly score generated for the input operation data. Further the method includes outputting a result based on the detection score.

20 Claims, 9 Drawing Sheets

(56) References Cited

U.S. PATENT DOCUMENTS

| | | | | |
|---|---|---|---|---|
| 2017/0364821 A1* | 12/2017 | Mathur | ................... | G06N 5/01 |
| 2018/0241762 A1* | 8/2018 | Savalle | ................. | G06N 3/006 |
| 2018/0361995 A1 | 12/2018 | Basir et al. | | |
| 2019/0139450 A1* | 5/2019 | Truong | ................... | G07C 5/08 |
| 2019/0263417 A1* | 8/2019 | Rau | ........................ | H04W 4/90 |

OTHER PUBLICATIONS

Feinstein Z, Volume-weighted average price, Jun. 14, 2012, p. 1. (Year: 2012).*

Takayuki Osogami, Regularized Dynamic Boltzmann Machine with Delay Pruning for Unsupervised Learning of Temporal Sequences, Sep. 22, 2016, p. 2. (Year: 2016).*

Shi et al. ("Evaluating Driving Styles by Normalizing Driving Behavior Based on Personalized Driver Modeling", IEEE, vol. 45, No. 12, Dec. 2015) (Year: 2015).*

Bittner et al., "Detecting of Fatigue States of a Car Driver", International Symposium on Medical Data Analysis. Sep. 29, 2000. pp. 260-273.

Li et al., "Automatic Detection of Driver Fatigue Using Driving Operation Information for Transportation Safety", Sensors. vol. 17. Issue 6. May 25, 2017. pp. 1-11.

Sahayadhas et al., "Detecting Driver Drowsiness Based on Sensors: a Review", Sensors. vol. 12. Issue 12. Dec. 7, 2012. pp. 16937-16953.

Chinese Office Action issued in CN Application No. 2020103907355, Dated Jan. 12, 2022, pp. 1-12.

* cited by examiner

DETECTION OF OPERATION TENDENCY BASED ON ANOMALY DETECTION

BACKGROUND

The present disclosure, generally, relates to operation tendency detection, more particularly, to a technique of detecting operation tendency of an apparatus by an operator.

The operation tendency detections such as driver change detections and driver drowsiness detections are helpful to investigate traffic accident and to prevent traffic accident. Facial images captured by cameras are used to detect the drowsiness of the driver. Also biometric information based on physical features such as electrooculogram is used to detect the drowsiness of the driver. In general, cameras and biometric sensors require expensive instrumentation cost and such information is subjected to a matter of privacy.

SUMMARY

According to an embodiment of the present invention, a computer-implemented method for detecting an operation tendency is provided. The method includes preparing a general model for generating a general anomaly score. The method also includes preparing a specific model, for generating a specific anomaly score, trained with a set of a plurality of operation data related to operation by a target operator. The method includes also receiving input operation data. The method includes further calculating a detection score related to the operation tendency by using a general anomaly score and a specific anomaly score generated for the input operation data. Further, the method includes outputting a result based on the detection score.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for detecting an operation tendency by using a plurality of anomaly detection models, in which the operation tendency to be detected is a driving tendency of an automobile that would indicate a driver change of the automobile.

Hereinafter, first referring to FIGS. 1, 2, and 3, a computer system for detecting a driving tendency indicating a driver change of an automobile according to an exemplary embodiment of the present invention will be described. Then, referring to FIGS. 4, 5, and 6, a method for detecting a driving tendency indicating a driver change of an automobile according to an exemplary embodiment of the present invention will be described. Then, with reference to FIG. 7 and FIG. 8, exemplary embodiments of an apparatus and a system implementing the driver change detection system according to one or more embodiments of the present invention will be described. Finally, referring to FIG. 9, a hardware configuration of a computer system according to one or more embodiments of the present invention will be described.

Figure 1:
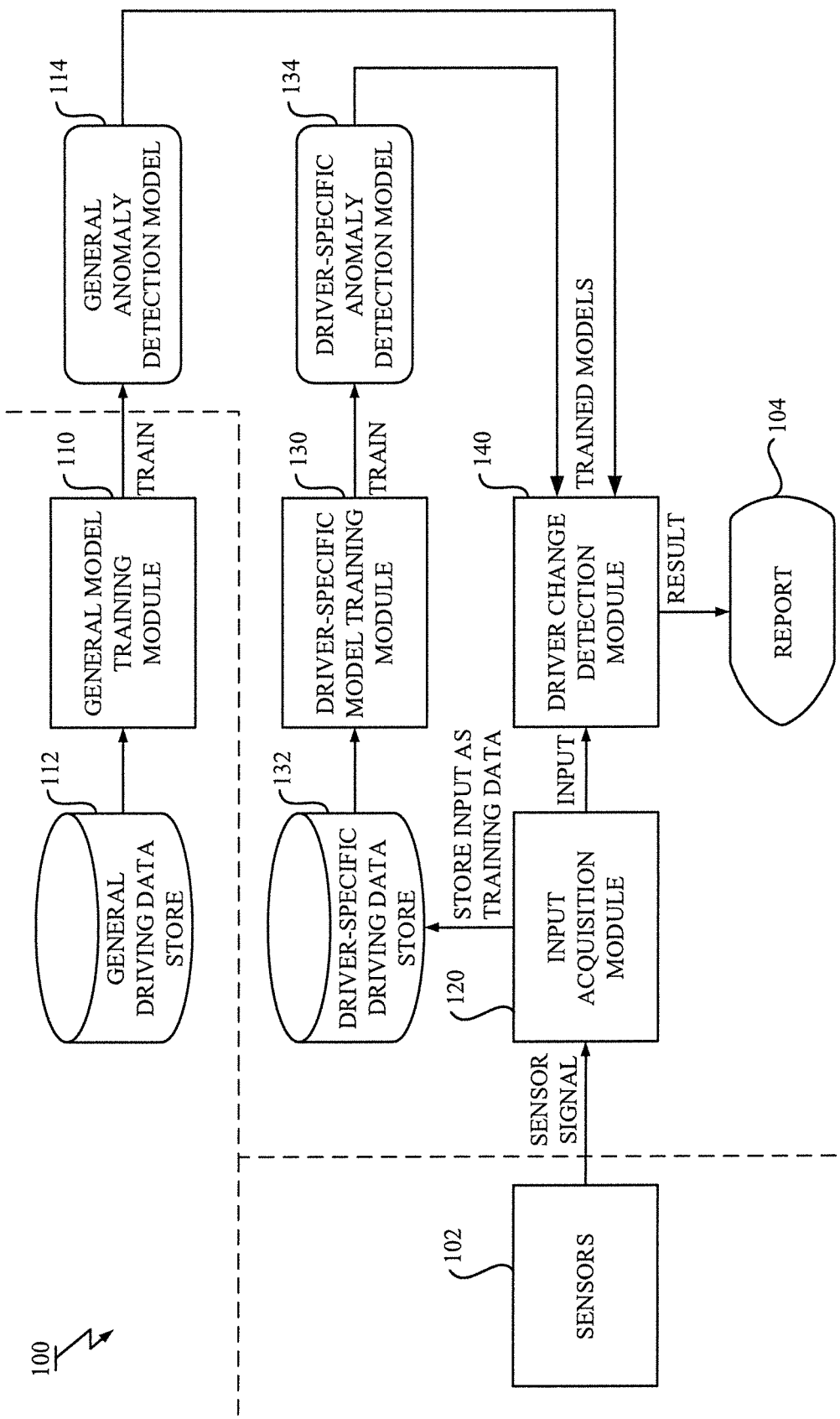
FIG. 1 illustrates a block diagram of a driver change detection system for detecting a driving tendency indicating a driver change of an automobile according to an exemplary embodiment of the present invention.

Referring to FIG. 1, a block diagram of a driver change detection system 100 according to an exemplary embodiment of the present invention is described.

As shown in FIG. 1, the driver change detection system 100 includes sensors 102 for generating sensor signals; a general model training module 110 for training a general anomaly detection model 114; and a general driving data store 112 for storing a collection of driving data of a variety of drivers, which is used to train the general anomaly detection model 114.

The driver change detection system 100 also includes an input acquisition module 120 for acquiring the sensor signals from the sensors 102; a driver-specific model training module 130 for training a driver-specific anomaly detection model 134; and a driver-specific driving data store 132 for storing a collection of driving data obtained from a driver (may be a single driver) in local environment, which is used for training the driver-specific anomaly detection model 134.

The driver change detection system 100 further includes a driver change detection module 140 for performing driver change detection based upon the general anomaly detection model 114 and the driver-specific anomaly detection model 134; and an output device 104 for outputting a result of the driver change detection.

The sensors 102 may include one or more sensors, each of which is configured to output a sensor signal, which is then transmitted to the subsequent input acquisition module 120. The sensor signal generated by one of the sensors 102 is generated in the form of either an analog signal or a digital signal, however, is acquired by the input acquisition module 120 in the form of the digital signal with a predetermined sampling frequency.

In one or more embodiments, any one of mechanical sensors that measure mechanical properties such as inertia, force and displacement, physical sensors that measure physical properties such as magnetic field and other sensors that measures other properties relating to the driving of the automobile is preferably employed as one of the sensors 102.

More specifically, the sensors 102 may include one or more sensors selected from a group including an accelerometer for measuring one or more accelerations (e.g., x, y and z accelerations for a three-axis accelerometer); a gyroscope for measuring one or more angular velocities (e.g., roll, pitch and yaw axes angular velocities for a three-axis gyroscope); a speedometer for measuring (instantaneous) vehicle speed; a steering angle sensor for measuring a steering (wheel position) angle; a GPS (Global Positioning System) sensor for measuring latitude, longitude and/or height; a magnetometer such as a miniaturized microelectromechanical systems (MEMS) magnetometer for measuring azimuth and/or inclination; an accelerator pedal position sensor for measuring a depression amount and/or depression speed of an accelerator pedal; a throttle position sensor for measuring a position of a throttle valve; a brake pedal position sensor for measuring a depression amount and/or depression speed of a brake pedal.

Each of aforementioned sensors may be embedded in any automotive electronics such as an automotive navigation system and a driving recorder. Note that the driving recorder includes a dashboard camera, which is purchased from the automotive aftermarket and installed into an automobile after the sale of the automobile, and an event data recorder (EDR), which may be installed by a manufacturer into an automobile (e.g., in a restraint system control module) before the sale of the automobile.

Practically, one or more sensors that are available to the drive recorder are preferably employed as the sensors 102. The usage of data available to the drive recorder makes it the detection possible with a low cost.

The input acquisition module 120 is configured to acquire the sensor signals transmitted from the sensors 102 to obtain driving data related to driving of a driver, which is then used for the driver change detection based upon a plurality of anomaly detection models.

One driving data may include a sequence of vectors in time order (i.e., time series), in which each vector is recorded at a predetermined recording frequency. Each vector includes a plurality of recorded values selected from a group including accelerations of x, y and z axes, angular velocities of roll, pitch and yaw axes, a vehicle speed, a steering angle, latitude, longitude, height, an azimuth, a depression amount and a depression speed of an accelerator pedal, a position of a throttle valve, a depression amount and a depression speed of a brake pedal, and processed values obtained therefrom.

The processed values may be obtained by processing any one of the aforementioned recorded values. The way of processing or conversion to obtain the process value may include, but not limited to, differentiation, integration, computing difference, moving average, Fourier transform, to name but a few. For example, such processed values include vehicle velocity, azimuth difference and jerk. The vehicle velocity is a time integration of the acceleration. The azimuth difference is difference in azimuth between two points of time and relates to velocity of the azimuth. The jerk is a rate of change of the acceleration for an axis (x, y, z-axis acceleration-based jerks that are time derivatives of the x, y, z-axis accelerations, respectively). Furthermore, aforementioned processing or conversion may be applied multiple times to the recorded value. For example, the jerk may be obtained as second time derivative of the vehicle speed (speed-based jerk). Acceleration in the azimuth may be obtained as second time derivative of azimuth. The processed value may be represented in a linear scale or log scale. For example, a logarithm of difference in azimuth that is obtained by adding 1 to an absolute value of difference in azimuth and taking its logarithm may be used. Components of a plurality of axes may be treated separately as a vector, or may be treated together as magnitude or an absolute value of the vector. Furthermore, each vector may include a plurality of recorded values and/or processed values obtained at different timings when using non-time series model, for example.

Non-limiting examples of the processed values other than the aforementioned processed values may include magnitude of acceleration in longitude and latitude that is absolute values of a vector of second time derivatives of longitude and latitude; and longitude and latitude-based jerk that is a vector of third time derivatives of longitude and latitude; and speed-based acceleration that is time derivative of the vehicle speed.

Note that two of the recorded and processed values may be related to and complementary to each other. For example, the jerk for an axis of travel direction of the automobile (a time derivative of the x-axis acceleration) relates to depression speeds of the brake and acceleration pedals. Although there is no obstruction to using in combination, the information of the depression speed of the acceleration and brake pedals may be omitted when the accelerations are available. The vehicle velocity, which is a time integration of accelerations, along with the axis of the travel direction of the automobile relates to the vehicle speed measured by speedometer. Thus, although there is no obstruction to using in combination, the information of t the vehicle speed measured by speedometer may be omitted when the accelerations are available. Also, the azimuth relates to a steering angle. Thus, although there is no obstruction to using in combination, the information of the steering angle may be omitted when the azimuth is available.

In a preferable embodiment, a combination of the vehicle speed (recorded value), the x-axis acceleration (recorded value), the y-axis acceleration (recorded value), the z-axis acceleration (recorded value), the x-axis acceleration based jerk (processed value), the y-axis acceleration based jerk (processed value), the z-axis acceleration based jerk (processed value), the velocity of the azimuth or the azimuth difference (processed value); and the logarithm of the difference in the azimuth (processed value).

Note that image data, image related information, audio data, audio related information and a physical feature based biometric information, which require more computational resources (for image processing, sound processing) and/or extra devices (e. g, a facial camera, an image processing circuit, a microphone, an audio processing circuit, a biometric measurement device, etc.), and are subjected to a matter of privacy, are excluded from the driving data even when the image data is available in the dashboard camera.

Note that the recording frequency may be different from the sampling frequencies of the sensors 102. In such case, the driving data is configured to have a sequence of vectors having predetermined time intervals aligned across multiple sensors by performing interpolation based on timestamps or respective sampling frequencies.

The general driving data store 112 is configured to store a collection of a plurality of driving data ($D_g$) that are obtained from a variety of drivers with different skills. The plurality of the driving data of the variety of the drivers may have been collected from a plurality of automobiles actually running on roads. Each driving data stored in the general driving data store 112 includes an episode of driving performed by one driver, containing a sequence of vectors from the start of the driving to the end of the driving. In a particular embodiment, the driving data may be separated at positions of an engine start, an engine stop and relatively long term parking without moving (with engine idling), during which it is possible to change drivers. The engine start indicates a start of a new driving episode and may initiate recording of the sensor signals of the sensors 102. The engine stop indicates an end of the driving episode and may terminate the recording of the sensor signals of the sensors 102. The start of the long term parking with engine idling, which appears as a long period having approximately speed zero, indicates an end of the driving episode whereas the end of the long term parking with engine idling indicates a start of a new driving episode.

The general model training module 110 is configured to train an anomaly detection model using the driving data stored in the general driving data store 112 to prepare the general anomaly detection model 114 ($f_g$). The general anomaly detection model 114 is an anomaly detection model for generating a general anomaly score for each point of time in a given input of driving data. The general anomaly detection model 114 is a kind of unsupervised model since it does not require correct label information indicating a region where a specific driver drives. The general anomaly detection model 114 is said to be "general" in a sense that it leans average characteristics of the variety of the drivers with different skills. In a particular embodiment, the driving data stored in the general driving data store 112 is prepared and the general anomaly detection model 114 is trained at a side of a vender of an apparatus implementing the system 100 (e.g., driving recorder) prior to shipment of the apparatus. Thus, the general anomaly detection model 114 may be fixed after shipment. However, the general anomaly detection model 114 may be updated with firmware update after shipment.

The driver change detection system 100 operates in a plurality of phases, including a training phase and an inference phase. In the training phase, the input acquisition module 120 is configured to acquire the sensor signals and store the driving data into the driver-specific driving data store 132 as training data while a target driver in local environment (an owner or user of the automobile, their family such as a spouse, a child and a parent, or their member, etc., and may be one driver) drives the automobile.

The driver-specific driving data store 132 is configured to store the collection of the plurality of the driving data related to the driving of the target driver or driver-specific driving data ($D_s$).

In the described embodiment, the target driver is requested to perform the driving of the automobile successively (not meaning continuous driving without stopping) for at least a predetermined period or distance until the sufficient amount of the training data (e.g., a sufficient number of the episodes or a sufficient total length of the driving) has been obtained for training the driver-specific anomaly detection model 134 with some extent of performance. Each driving data stored in the driver-specific driving data store 132 is also an episode of driving performed by the target driver, containing a sequence of vectors from a start of the driving to an end of the driving, as similar to the driving data stored in the general driving data store 112.

Note that the aforementioned processed values obtained from the recorded values may be stored in the driver-specific driving data store 132 together with the recorded values. Alternatively, merely the recorded values may be stored in the driver-specific driving data store 132 and the aforementioned processed values may be converted from the recorded values stored in the driver-specific driving data store 132 as needed. Also, the recorded values and/or the processed values may be stored in the driver-specific driving data store 132 with the predetermined time intervals aligned across the multiple sensors 102. Alternatively, the recorded values and the processed values may be stored in the driver-specific driving data store 132 with their respective sampling or recording frequencies and the values with the predetermined time intervals may be converted from data stored in the driver-specific driving data store 132 by performing interpolation based on timestamps or respective sampling frequencies as needed.

The driver-specific model training module 130 is configured to train an anomaly detection model with the driver specific driving data stored in the driver-specific driving data store 132 to prepare the driver-specific anomaly detection model 134 ($f_s$). The driver-specific anomaly detection model 134 is an anomaly detection model for generating a driver-specific anomaly score for each point of time in a given input of driving data. The driver-specific anomaly detection model 134 is a kind of unsupervised model since it does not require correct label information indicating a region where the target driver drives. In a particular embodiment, the driver-specific anomaly detection model 134 ($f_s$) may be trained on a basis of the general anomaly detection model 114. In this particular embodiment, the general anomaly detection model 114 is used to initialize the anomaly detection model before the training of the driver-specific anomaly detection model 134.

The driver-specific model training module 130 is said to be "specific" in a sense that it leans characteristics of mainly the target driver instead of a variety of the drivers that are targeted in training the general anomaly detection model 114. In a particular embodiment, the driving data related to the target driver may be collected into the driver-specific driving data store 132 during the use of the automobile after the shipment and accordingly the driver-specific anomaly detection model 134 is trained during the use of the automobile.

The training of the driver-specific anomaly detection model 134 may be performed after the sufficient amount of training data has been accumulated in the driver-specific driving data store 132 (offline or batch learning). Alternatively, the training of the driver-specific anomaly detection model 134 may be performed each time the training data is available (online learning).

In the inference phase, the input acquisition module 120 is configured to pass the driving data obtained from the sensors 102 to the driver change detection module 140 sequentially, as an input for the driver change detection.

The driver change detection module 140 is configured to prepare the general anomaly detection model 114 and the driver-specific anomaly detection model 134 on a memory by reading contents of these models in response to the system 100 being started up in an inference mode. The driver change detection module 140 is configured to receive the input driving data from the input acquisition module 120 and to detect, for the input driving data, a driving tendency indicating a driver change of the automobile using the plurality of the anomaly detection models 114, 134. More specifically, the driver change detection module 140 is configured to calculate a detection score related to the driver change based upon the plurality of the anomaly detection models 114, 134.

In a particular embodiment, the detection of the driving tendency may be conducted for input driving data as an ongoing episode that is currently obtained by incorporating a part received from the input acquisition module 120 into the input driving data sequentially. In this particular embodiment, the input driving data includes a sequence of vectors from a start of driving to the present of the detection. Thus, the detection of the driving tendency may be performed in real time.

In other particular embodiment, the detection of the driving tendency may be conducted for input driving data as a complete episode including a sequence of vectors from a start of driving to an end of the driving.

The output device 104 is configured to output a result of the driver change detection based on the detection score calculated by the driver change detection module 140. The result may indicate a driver change for the given input driving data when a predetermined condition related to the detection score is satisfied. More detail about the predetermined condition related to the detection score will be described later.

In a particular embodiment, the result of the driver change detection may be an alert or notification indicating that driving by a driver different from a usual driver (the target driver learned by the driver-specific anomaly detection model 134) has detected. The output device 104 may be any one of known output devices including, but not limited to, a display, a speaker, a light indicator, printer, storage, etc. The alert or notification may be emitted in a form of sound, voice, text, image or light pattern, etc.

Figure 2:
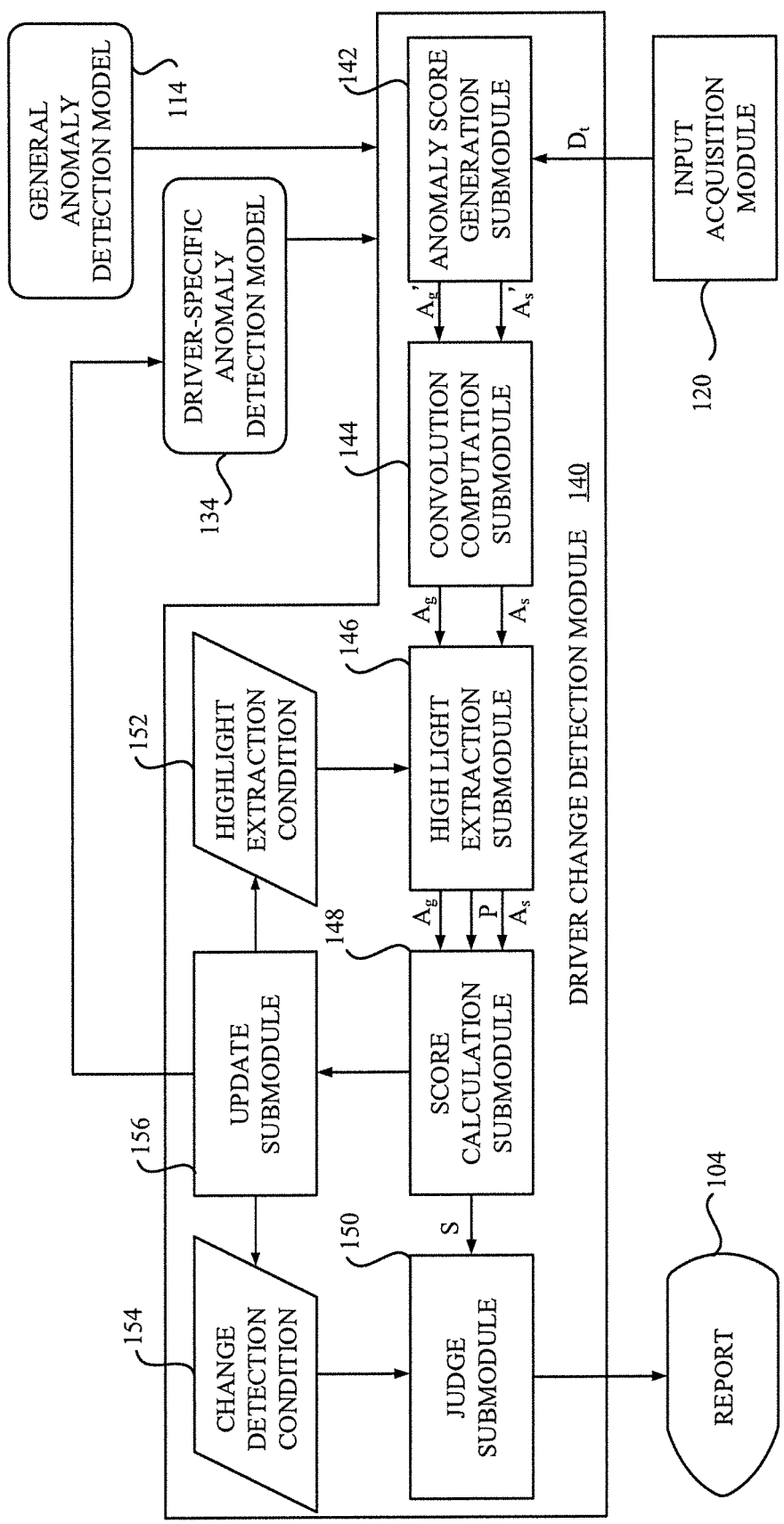
FIG. 2 illustrates a detailed block diagram of a driver change detection module in the driver change detection system according to the exemplary embodiment of the present invention.

With reference to FIG. 2, the driver change detection is described in more detail. As shown in FIG. 2, the driver change detection module 140 includes an anomaly score generation submodule 142 for generating general and driver-specific anomaly scores based on the general and driver-specific anomaly detection models 114, 134; a score calculation submodule 148 for calculating a detection score based on the input driving data; and a judge submodule 150 for judging whether the driver change is detected or not based on the detection score to output a result. The driver change detection module 140 preferably includes a highlight extraction submodule 146 for extracting one or more highlight parts from the input driving data. The driver change detection module 140 also includes preferably a convolution computation submodule 144 for performing convolution of the general and driver-specific anomaly scores.

The anomaly score generation submodule 142 is configured to receive the input driving data ($D_t$), which is a sequence of vectors in time, from the input acquisition module 120. The anomaly score generation submodule 142 is configured to generate a sequence of general anomaly scores ($A_g'$) based on the general anomaly detection model 114 and a sequence of driver-specific anomaly scores ($A_s'$) based on the driver-specific anomaly detection model 134 for the input driving data ($D_t$). The general and driver-specific anomaly scores are generated for each point of time in the input driving data.

In a particular embodiment, the anomaly score generation submodule 142 generates parts of the sequences each time it receives a part of the input driving data ($D_t$) acquired by the input acquisition module 120. The generated part of the sequence of the general anomaly scores and the generated part of the sequence of the driver-specific anomaly scores may be passed to the convolution computation submodule 144 sequentially.

The convolution computation submodule 144 may be configured to perform convolution of the sequence of the general anomaly scores ($A_g'$) and convolution of the sequence of the driver-specific anomaly scores ($A_s'$) with an appropriate function. The results of the convolution of the sequences, $A_g$, $A_s$ may be passed to the highlight extraction submodule 146. By performing the convolution, the influence of noise in anomaly scores on the detection score may be mitigated and the driver change detection would be focused on a period of anomaly.

The highlight extraction submodule 146 is configured to extract one or more highlight parts (P) from the input driving data ($D_t$). In the described embodiment, the one or more highlight parts (P) are extracted from the input driving data ($D_t$) using a highlight extraction condition 152. The highlight part (P) is a part satisfying the highlight extraction condition 152 related to the general anomaly score ($A_g$) and/or the driver-specific anomaly score ($A_s$). In a preferable embodiment, a highlight extraction condition 152 related to the general anomaly score ($A_g$) is employed since the general anomaly detection model 114 ($f_g$) is expected to calculate appropriate score at the beginning just after the shipment.

The highlight extraction condition 152 may include a condition for extracting a peak that has magnitude more than a peak threshold with respect to the general anomaly score ($A_g$) and/or the driver-specific anomaly score ($A_s$). In the described embodiment, the highlight extraction condition 152 includes a peak threshold ($P_{thres}$) with respect to the general anomaly score ($A_g$). The peak threshold ($P_{thres}$) may be calculated using the collection of the driver-specific driving data stored in the driver-specific driving data store 132.

In one or more embodiments, the peak threshold ($P_{thres}$) may be set in relation to a statistic of the general anomaly scores ($A_g$) and/or the driver-specific anomaly scores ($A_s$) calculated for the driver-specific driving data store 132. The statistic of the anomaly scores ($A_g$ and/or $A_s$) may be a maximum, mean, median, n-quantile. In a particular embodiment, the peak threshold ($P_{thres}$) may be set to a value obtained by multiplying the maximum of the anomaly scores ($A_g$ and/or $A_s$) by a predetermined ratio.

The highlight part (P) corresponds to a driving highlight that is supposed to easily reflect the driving characteristics of the driver. Such driving highlight may be a part where the driver has performed an obvious operation (e.g., acceleration, brake, steering etc.). More specifically, the driving highlight may include left turns, right turns, driving on a traffic circle, overtaking of a leading vehicle, stopping from a cruising speed, acceleration from a stop, slope starting, etc. Such obvious operations are expected to generate a peak of some magnitude in the time series of the general anomaly score ($A_g$) and the driver-specific anomaly score ($A_s$).

On the other hand, the highlight part would not include a part corresponding to driving on a flat way (e.g., highway) with a cruising speed, which would be generally difficult to tell the difference of the drivers. Such non-obvious operations are expected to generate only small fluctuations in the time series of the general anomaly score ($A_g$) and the driver-specific anomaly score ($A_s$).

Individuality of the driver appears in a way that the driver drives the automobile, especially, in a situation where specific maneuvers (e.g., left turns, right turns, braking, and the like) are performed. The extraction of the highlight part (P) from the input driving data ($D_t$) is a process to identify one or more parts where such individuality is expected to appear.

The score calculation submodule 148 is configured to calculate a detection score related to the driver change (S) by using a general anomaly score ($A_g$) and a driver-specific anomaly score ($A_s$) generated for the input driving data ($D_t$), especially, at least the one or more highlight parts (P). By placing emphasis on the extracted highlight parts (P) to calculate the detection score (S), the accuracy of the driver change detection is expected to be improved.

In one or more embodiments, the detection score is calculated as a relation between general and driver-specific anomaly scores. In one or more preferable embodiments, as a form of the aforementioned relation, the detection score is calculated as a ratio of the driver-specific anomaly score to the general anomaly score or a difference between the driver-specific anomaly score and the general anomaly score. In a preferable embodiment, the ratio of the driver-specific anomaly score to the general anomaly score is used as the detection score. The ratio is calculated as a ratio of a sum of one or more driver-specific anomaly scores to a sum of one or more general anomaly scores that are generated for the one or more highlight parts (P). In other particular preferable embodiment, the ratio is calculated as a ratio of a driver-specific anomaly score to a general anomaly score at some sampling point.

In a particular embodiment, the detection score is calculated for a part of the input driving data that is available at the time of the driver change detection. The driver change detection is attempted for each point of time in the input driving data. Thus, the detection scores are calculated to generate a sequence of detection scores, each of which represents a value cumulatively calculated using the available data starting from the start of the current driving to the present of the detection.

However, the way of calculating the detection scores is not limited. In other particular embodiment, the detection score is calculated for a part of the input driving data that is in a time window set from the time of the driver change detection with a predetermined window width. The driver change detection is also attempted for each point of time in the input driving data. Thus, the detection scores are calculated to generate a sequence of detection scores, each of which represents an instantaneous value calculated from the available data in the time window. In further other particular embodiment, the detection score is calculated for the whole of the input driving data.

In a particular embodiment, remaining parts of the input driving data other than the highlight parts (P) are ignored in calculating the detection score. However, in other embodiment, the remaining parts may be used to calculate the detection score while applying a larger weight to the extracted highlight parts (P) than the remaining parts.

The judge submodule 150 is configured to judge whether the detection score indicates s driver change of the automobile to generate a result. In the described embodiment, judgement as to whether the detection score indicates the driver change or not is performed in a manner based upon a change detection condition 154. The change detection condition 154 may include a score threshold ($S_{thres}$) with respect to the detection score (S). The detection threshold ($S_{thres}$) may be calculated using the collection of the driver-specific driving data stored in the driver-specific driving data store 132.

In one or more embodiments, the detection threshold may be set in relation to a statistic of the detection scores calculated for the driver-specific driving data store 132. The statistic of the detection scores may be a maximum, mean, median, n-quantile (e.g., 0.75 quantile), to name but a few. In a particular embodiment, the detection threshold ($S_{thres}$) may be set to the maximum of the detection scores calculated for the driver-specific driving data store 132.

The detection threshold may be adjusted in light of a purpose of an application, in reference to a distribution of the detection scores calculated for the driver-specific driving data store 132. More preferably, the detection threshold may be adjusted in reference to a ROC (Receiver operating characteristic)-AUC (Area Under Curve) if driving data of other drivers is available. For example, the detection threshold may be set lower in applications where a priority is given to alerting or notification over accuracy. In contrast, the detection threshold may be set higher in applications where a priority is given to accuracy over alerting or notification.

Note that in the described embodiment, the general anomaly score and the driver-specific anomaly score are subjected to convolution before calculating the detection score. However, the general anomaly score and the driver-specific anomaly score are not limited to be used in a form of the convolution to calculate the detection score. In other embodiment, the general anomaly score and the specific anomaly score are used without performing convolution to calculate the detection score.

In the described embodiment, the judge submodule 150 is described to perform a simple binary classification using the detection threshold ($S_{thres}$). Such a simple mechanism to obtain a result as to whether a driver change is detected or not is preferred for real-time detection, especially in in-vehicle devices that have generally limited computational resources. Also the detection thresholds ($S_{thres}$) may be set arbitrarily in such the simple mechanism.

However, in other embodiments where computational resource constraints are relatively more relaxed in comparison with aforementioned case and correct labels representing whether the driver is changed or not for the training driving data are available, not only a simple binary classification but also more sophisticated classification models, including artificial neural network and support vector machines that use the detection score as a input feature for the subsequent classification model are contemplated.

As shown in FIG. 2, the driver change detection module 140 may further include an update submodule 156 for updating (parameters of) the driver-specific anomaly detection model 134. The update submodule 156 is configured to update the driver-specific anomaly detection model 134 using the input operation data currently obtained, in response to an update condition being satisfied.

The update condition may include a setting value that designates whether to perform an online update or not. If the setting value indicates to perform the online update, the update condition may further include a condition to update. For example, the update condition may include a condition to stop online updating once driver change has been detected for the current input driving data. More detail about the update condition will be described latter.

Figure 3:
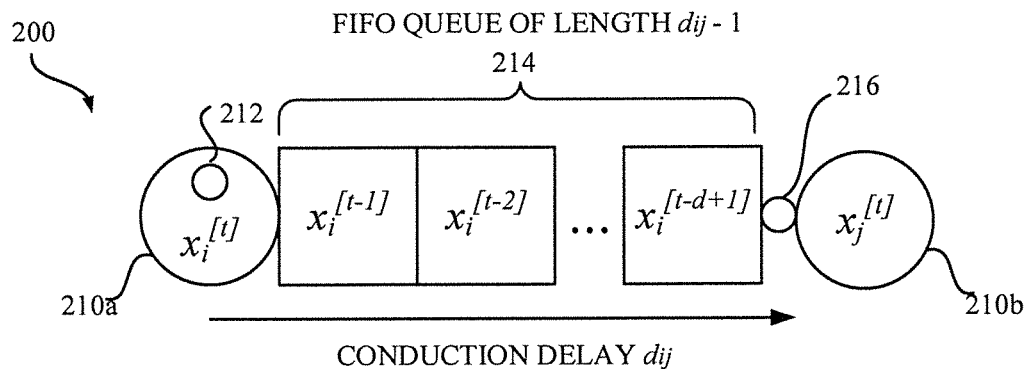
FIG. 3 illustrates a schematic of architecture of an anomaly detection model that is used as both of general and driver-specific anomaly detection models according to one or more embodiments of the present invention.

With reference to FIG. 3, architecture of an anomaly detection model that is used as both of general and specific anomaly detection models according to one or more embodiments of the present invention is described. In a preferable embodiment, the general anomaly detection model 114 and the driver-specific anomaly detection model 134 have architectures of a dynamic Boltzmann machine (DyBM). FIG. 3 shows architecture that is based on the dynamic Boltzmann machine (DyBM).

A dynamic Boltzmann machine or DyBM is a model of a spiking neural network, and its learning rule of maximizing the log-likelihood of given time-series exhibits properties of spike-timing dependent plasticity (STDP), which have been postulated and experimentally confirmed in the field of the neuroscience as a learning rule that refines the Hebbian rule.

The DyBM includes a network of a set of neurons. A pair of neurons is connected through a synapse. There is a pre- and post-synaptic relationship between connected neurons. Note that any neuron may be called a pre-synaptic neuron and a post-synaptic neuron depending on the synapse under consideration.

The diagram 200 shows a connection from a pre-synaptic neuron 210a (i) to a post-synaptic neuron 210b (j) in the DyBM. The pre-synaptic neuron 210a (i) is connected to the post-synaptic neuron 210b (j) via a FIFO (First-In-First-Out) queue 214. The FIFO queue 214 stores the values of the pre-synaptic neuron 210a (i) for the last $d_{ij}-1$ units of time. Each stored value is pushed one position toward the head of the FIFO queue 214 when the time is incremented by one unit. The value of the pre-synaptic neuron 210a (i) is thus given to the post-synaptic neuron 210 after the conduction delay ($d_{ij}$). Note that the conduction delay ($d_{ij}$) is sampled independently and different for each connection between the neurons. Alternatively, the conduction delay ($d_{ij}$) may be common over the plurality of connections between the neurons.

Each neuron 210 has a first memory unit 212 for storing neural eligibility traces, which summarize activities of the neuron in the past. Also a second memory unit 216 is associated with a synapse between the pre-synaptic neuron 210a (i) and the post-synaptic neuron 210b (j). The second memory unit 216 is used for storing a synaptic eligibility trace that summarizes the spikes arrived at the synapse via the FIFO queue 214 from the pre-synaptic neuron 210a (i).

The DyBM aggregates information about the spikes in the past into the neural eligibility traces and the synaptic eligibility trace, which are stored in the memory units 212, 216. The value of the neural eligibility trace increases when an associated neuron spikes and decreases otherwise. The value of a synaptic eligibility trace increases when the spike from a pre-synaptic neuron reaches a post-synaptic neuron and decreases otherwise.

In the DyBM, variables may include a value of the neuron j at time t, $x_j^{[t]}$, the neural eligibility traces stored in the first memory unit 212 and the synaptic eligibility traces stored in the second memory unit 216, which are updated when the DyBM is trained or is generating a sequence.

The diagram 250 describes a schematic of the DyBM unfolded in time. As shown in the diagram 250 of FIG. 3, the DyBM may be defined by using a finite dynamic Boltzmann machines having a T-layers as a limit where the number of the layers T becomes infinite (T→∞). The finite dynamic Boltzmann machines has a T−1 layers of input units 252 corresponding to the past time series and one layer of output units 252 corresponding to a next pattern. The dynamic Boltzmann machines may not have a hidden unit or may have a hidden unit.

The DyBM has learnable parameters that are updated during training, in addition to structural parameters that are fixed and are not updated when the DyBM is trained or is generating a sequence and the aforementioned variables.

The structural parameters may include the number of the neurons, the number of the neural eligibility traces for each neuron, the number of the synaptic eligibility traces for each pair of the neurons, the delay from the pre-synaptic neuron to post synaptic neuron, the decay rate of each neural eligibility trance, the decay rate of each synaptic eligibility traces, etc.

The learnable parameters of the DyBM are a bias $b_j$ given to each neuron j and a weight $w_{ij}^{[\delta]}$, which denotes the weight between the i-th unit at time $-\delta$ and the j-th unit at time 0. This weight may be divided into two types of weights including a LTP (Long Term Potentiation) weight, in which the synapse is strengthened if the spike of a pre-synaptic neuron precedes the spike of a post-synaptic neuron, and a LDP (Long Term Depression) weight, in which the synapse is weakened if the temporal order is reversed.

Each neuron originally takes a binary value (0 or 1) that the neuron takes the value 1 (i.e., it spikes) at any moment depends on the previous values of the variable of the neurons as well as the values of the learnable parameters of the DyBM. However, the DyBM may be extended to take a real value by using Gaussian unit (i.e., Gaussian DyBM).

Since the DyBM predicts next values of time-series when a past part of time series is given, the anomaly score may be calculated as an error of the predicted next values from actually observed values such as a RMSE (Root Mean Square Error). In other embodiment, the anomaly score may be calculated as a negative log-likelihood instead of RMSE.

In order to adjust the learnable parameters in the DyBM, an online gradient ascent method may be used to maximize the likelihood of given sequential patterns. The learnable parameters are updated only on the basis of the information that is available at the associated synapse or neuron, and there is no need to store the whole sequence for learning via backpropagation through time as needed in the learning of the RNN (Recurrent Neural Network).

The dynamic Boltzmann machine is preferable since it is lightweight in terms of both of training and inference. Thus, even when computational resources are practically limited in a case such that an in-vehicle computer system, the general and driver-specific anomaly detection models 114, 134 can be running on the system in real time.

Note that the architecture of the anomaly detection model used as general and specific anomaly detection models is not limited to the dynamic Boltzmann machine specifically described above. Other anomaly detection model such as RNNs (Recurrent Neural Networks; including LSTM (Long short-term memory)) based model may also be employed in a light of computational resource constraints. Although time series models that can handles temporal context are preferably employed, however, in a further other embodiment, non-time series type models such as a proximity-based anomaly detection model using sparse structure learning and a linear regression based model may also be used as the anomaly detection model.

However, it is preferable that the architecture of the general anomaly detection model 114 and the driver-specific anomaly detection model 134 be the same since reactivity of the models for the same input may differ depending on the architecture of the models. Thus, although a more resource-consuming model may be contemplated potentially as the general anomaly detection model 114 since it can be trained at the side of the vendor, however, the same light weight model is preferably employed as both of the driver-specific anomaly detection model 134 and the general anomaly detection model 114 especially when there is a computational resource constraint. Although it is not necessarily it is preferable that the number of the nodes in the anomaly detection model be the same.

In particular embodiments, each of modules 110, 120, 130 and 140 and models 114, 134 described in FIG. 1 and each of submodules 142, 144, 146, 148, 150 and 156 of the driver change detection module 140 shown in FIG. 2 may be implemented as, but not limited to, a software module including instructions and/or data structures in conjunction with hardware components such as a processor, a memory, etc.; a hardware module including electronic circuitry; or a combination thereof. These modules 110, 120, 130 and 140, these models 114, 134 and these submodules 142, 144, 146, 148, 150 and 156 described in FIG. 1 and FIG. 2 may be implemented on a single computer system such as a personal computer, a server machine and a microcontroller of an apparatus such as an automobile and an automotive equipment, or over a plurality of devices such as a client server system, an edge computing system, a computer cluster in a distributed manner.

Hereinafter, referring to flowcharts shown in FIG. 4 and FIG. 5 together with a time series schematically shown in FIG. 6, a process for detecting a driving tendency indicating a driver change of an automobile according to an exemplary embodiment of the present invention is described.

Figure 4:
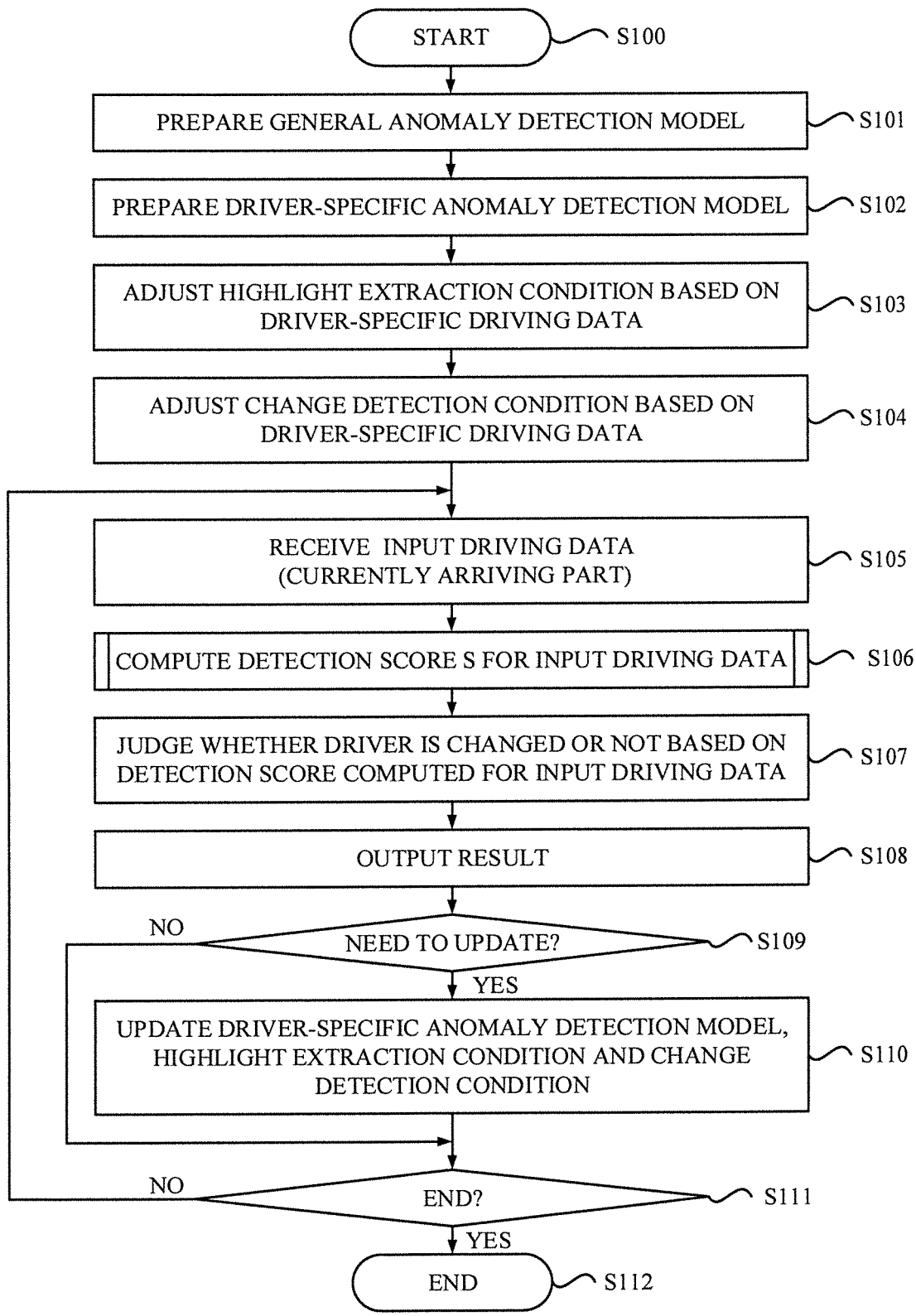
FIG. 4 is a flowchart depicting a process for detecting a driving tendency indicating a driver change of an automobile according to an exemplary embodiment of the present invention.

FIG. 4 shows a flowchart depicting a process for detecting a driving tendency indicating a driver change of an automobile. Note that the process shown in FIG. 4 may be performed by processing circuitry that implements the system 100 (at least the models 114, 134 and the modules 120, 130, 140) shown in FIG. 1. The process shown in FIG. 4 may begin at step S100 in response to the system 100 being started up.

At step S101, the processing circuitry may prepare a general anomaly detection model 114 ($f_g$) for generating a general anomaly score ($A_g'$). The general anomaly detection model 114 ($f_g$) may be prepared by reading contents (the learnable parameters and the structural parameters) of the general anomaly detection model 114 ($f_g$) that has already been trained with a collection of a plurality of driving data of a plurality of drivers ($D_g$) stored in the general driving data store 112. Alternatively, the general anomaly detection model 114 ($f_g$) may be prepared by training an anomaly detection model with the collection stored in the general driving data store 112 ($D_g$).

At step S102, the processing circuitry may prepare a driver-specific anomaly detection model 134 ($f_s$) for generating a driver-specific anomaly score ($A_s'$). The driver-specific anomaly detection model 134 ($f_s$) may be prepared by training an anomaly detection model with a collection of a plurality of driving data related to driving by a target driver (supposed to be driven mostly by one driver), which is stored in the driver-specific driving data store 132 ($D_s$). Alternatively, the driver-specific anomaly detection model 134 ($f_s$) may be prepared by reading contents (the learnable parameters and the structural parameters) of the driver-specific anomaly detection model 134 ($f_s$) that has already been trained with the collection stored in the driver-specific driving data store 132 ($D_s$).

At step S103, the processing circuitry may adjust a highlight extraction condition 152 based on the driver-specific driving data stored in the driver-specific driving data store 132. In the described embodiment, the highlight extraction condition 152 includes a condition for extracting a peak that has magnitude more than a peak threshold ($P_{thres}$) with respect to the general anomaly score ($A_g$). The peak threshold ($P_{thres}$) may be calculated using the collection of the driver-specific driving data stored in the driver-specific driving data store 132, as follows:

$$P_{thres} = r \cdot P_{max},$$

where $P_{max}$ denotes a maximum in the general anomaly scores ($A_g$) calculated for the driver-specific driving data stored in the driver-specific driving data store 132 and a coefficient (r) represents a predetermined peak threshold ratio (e.g., 0.9).

At step S104, the processing circuitry may adjust a change detection condition 154 based on the driver-specific driving data stored in the driver-specific driving data store 132. In the described embodiment, the change detection condition 154 may include a score threshold ($S_{thres}$) with respect to the detection score (S). The detection threshold ($S_{thres}$) may be calculated using the collection of the driver-specific driving data stored in the driver-specific driving data store 132, as follow;

$$S_{thres} = S_{max},$$

where $S_{max}$, denotes a maximum in the detection scores (S) calculated for the driver-specific driving data stored in the driver-specific driving data store 132.

Note that in order to calculate the detection threshold ($S_{thres}$), a plurality of detection scores (S) for the driver-specific driving data stored in the driver-specific driving data store 132 are included to be calculated. The way of calculating the detection scores (S) will be described in more detail later, with reference to FIG. 5.

At step S105, the processing circuitry may receive input driving data ($D_t$), in which a currently arriving part received from the input acquisition module 120 is incorporated to form the input driving data ($D_t$). The input driving data ($D_t$) may be received from the input acquisition module 120 by acquiring sensor signals of the sensors 102. Alternatively, the input driving data ($D_t$) may be received from a driving recorder or an automobile through a network (e.g., a mobile network and internet). Alternatively, the input driving data ($D_t$) may be received by reading the input driving data from a storage medium that stores the input driving data.

At step S106, the processing circuitry may compute a detection score (S) related to the driver change based upon the plurality of the anomaly detection models 114, 134 ($f_g$, $f_s$).

Figure 5:
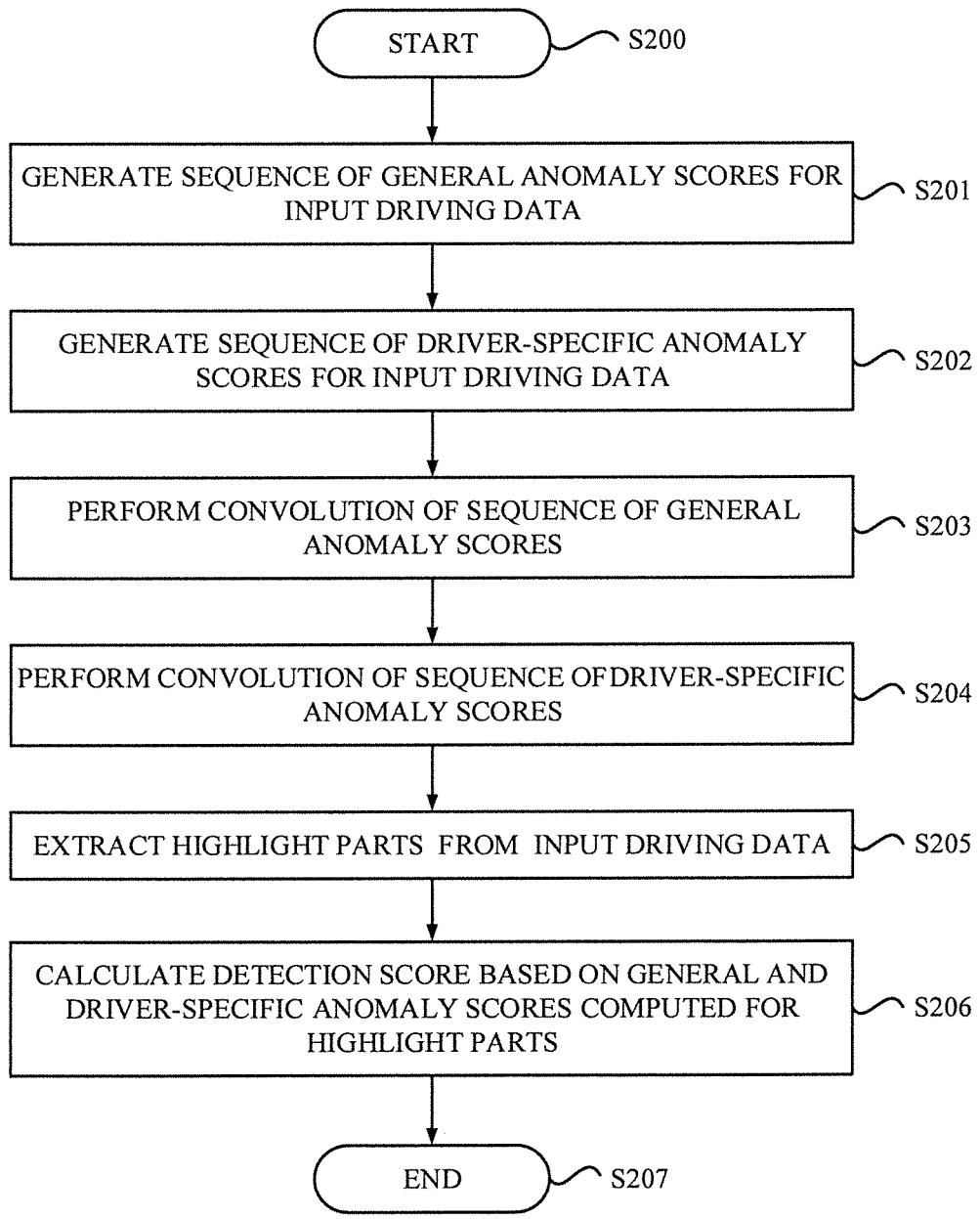
FIG. 5 is a flowchart depicting a process for calculating a detection score related to the driver change according to the exemplary embodiment of the present invention.

FIG. 5 is a flowchart depicting a process for calculating the detection score related to the driver change. Note that the process shown in FIG. 5 may be executed by processing circuitry that implements the modules 140 shown in FIG. 1 and its submodules shown in FIG. 2. The process shown in FIG. 5 may begin at step S200 in response to the processing of step S106 shown in FIG. 4 being called.

At step S201, the processing circuitry may generates, by the anomaly score generation submodule 142, a sequence of general anomaly scores ($A_g'$) for the input driving data ($D_t$) using the general anomaly detection model 114 ($f_g$). At step S202, the processing circuitry may generates, by the anomaly score generation submodule 142, a sequence of driver-specific anomaly scores ($A_s'$) for the input driving data ($D_t$) using the driver-specific anomaly detection model 134 ($f_s$).

At step S203, the processing circuitry may perform, by the convolution computation submodule 144, convolution of the sequence of the general anomaly scores ($A_g'$) to obtain a convoluted sequence ($A_g$) for the input driving data. At step S204, the processing circuitry may perform, by the convolution computation submodule 144, convolution of the sequence of the specific anomaly scores ($A_s'$) to obtain a convoluted sequence ($A_s$) for the input driving data. In the describe embodiment, the general anomaly score and the driver-specific anomaly score are used in a form of the convolution to calculate the detection score (S). The convolution of the sequence of the anomaly scores ($A_{g/s}$) may be expressed as follows:

$$A_{g/s}(i) = \int A_{g/s}(i)' g(i-\tau) d\tau,$$

$$g(i-\tau) = \begin{cases} \lambda^{i-\tau}, & \text{if } i-10 < \tau < i \\ 0, & \text{else} \end{cases},$$

where $\lambda$ is an appropriate cofficient (e.g., $\lambda=0.9$).

At step S205, the processing circuitry may extract one or more highlight parts (P) by the highlight extraction submodule 146 from the input driving data ($D_t$) based on the highlight extraction condition 152 related to the general anomaly score ($A_g$). The one or more highlight parts (P) satisfying the highlight extraction condition 152 is expressed as follows:

$$P = \{i | A_g(i) > A_g(m) \text{ AND } A_g(i) > P_{thres}\},$$

where m=[i−N, i+N], m≠i.

The aforementioned equation represents a condition for extracting one or more peaks that shows a maximum within a predetermined range (±N) around itself and has magnitude larger than the peak threshold ($P_{thres}$) with respect to the general anomaly score ($A_g$).

Figure 6:
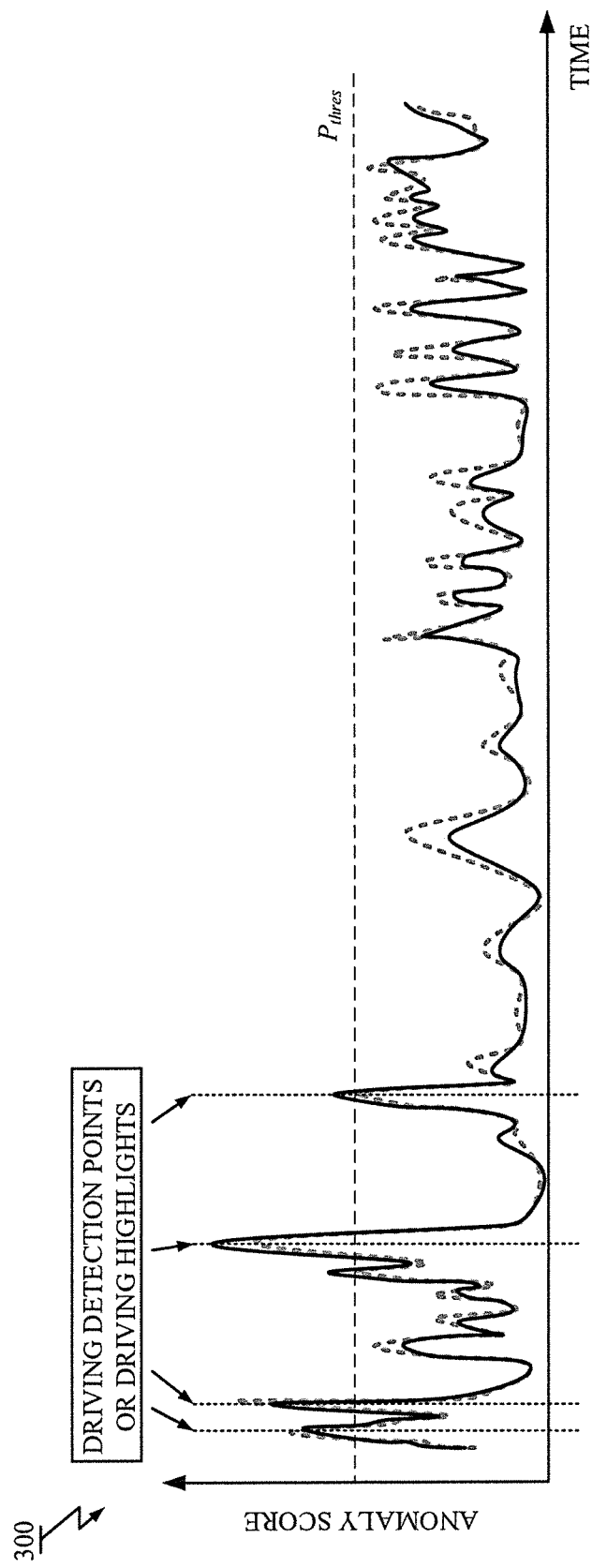
FIG. 6 depicts a schematic of a time series of general and driver-specific anomaly scores obtained for input driving data according to the exemplary embodiment of the present invention.

FIG. 6 depicts a schematic of a time series of general and driver-specific anomaly scores obtained for the input driving data. In the graph of FIG. 6, a solid black curve represents a time series of the general anomaly scores ($A_g$) whereas a dashed gray curve represents a time series of the driver-specific anomaly scores ($A_s$).

There are four driving detection points extracted as driving highlights, each of which corresponds to a peak of the general anomaly scores ($A_g$) having magnitude larger than the peak threshold ($P_{thres}$). Even a driving point where the driver-specific anomaly scores ($A_s$) shows merely a peak having magnitude equivalent to or smaller than the peak threshold ($P_{thres}$) is extracted as a highlight part as long as the peak of the general anomaly scores ($A_g$) has magnitude larger than the peak threshold ($P_{thres}$). However, small peaks observed in the general anomaly scores ($A_g$) that has magnitude equivalent to or smaller than the peak threshold ($P_{thres}$) are not extracted. Also even a point where the driver-specific anomaly scores ($A_s$) shows a peak having magnitude larger than the peak threshold ($P_{thres}$) but the general anomaly scores ($A_g$) does not show a peak larger than the peak threshold ($P_{thres}$) is not extracted as a highlight part.

As schematically illustrated in FIG. 6, only the peak values that are larger than ($P_{thres}$) are extracted as the highlight part. The peaks in a relative flat driving are not regarded as the highlight parts. The anomaly score is expected to give a different value for different models trained by different data. The relationship between the general anomaly score and the driver specific anomaly score for the driving highlights is supposed to be able to detect driver change.

Individuality of the target driver appears in the time series as difference between the driver-specific anomaly score and the general anomaly score, especially in a situation where specific maneuvers (e.g., left turns, right turns, braking, and the like) are performed. Such specific maneuvers may be detected as the driving highlight since such obvious operations (e.g., acceleration, brake, steering etc.) generates magnitude of anomaly scores at some extent. Extracting the highlight parts (P) from the input driving data ($D_t$) is a process to identify one or more parts where such individuality is expected to appear.

Referring back to FIG. 5, at step S205, the processing circuitry may calculate the detection score (S) based on the general and driver-specific anomaly scores computed for the one or more highlight parts (P). In the described embodiment, the detection scores (S) may be calculated as follows:

$$S = \frac{\Sigma A_s(i)}{\Sigma A_g(i)}, i \in P.$$

In the aforementioned equation, the detection score (S) is calculated as a ratio of a sum of one or more specific anomaly scores ($A_s$) to a sum of one or more general anomaly scores ($A_g$) generated for the one or more highlight parts (P). Note that the number of the driver-specific anomaly scores ($A_s$, that is numerators in the aforementioned equation) and the number of the general anomaly score ($A_g$, that is denominators in the aforementioned equation) are identical since the driving detection points are extracted for both the general and driver-specific anomaly scores ($A_g$ and $A_s$). Thus, there is no need to take respective averages of the general anomaly scores and the driver-specific anomaly scores.

The process shown in FIG. 5 may end at step S207 and back to a subsequent step after the processing of step S106.

Referring back to FIG. 4, at step S107, the processing circuitry may judge whether a driver is changed or not in a manner based on the detection score computed for the input driving data ($D_t$). The judgement as to whether the driver is changed or not may be performed as follows:

$$\text{Driver changed} = \begin{cases} \text{True}, & \text{if } S > S_{thres} \\ \text{False}, & \text{if } S \leq S_{thres} \end{cases}.$$

At step S108, the processing circuitry may output a result based on the detection score (S), which indicates a driver-change when the change detection condition 154 related to the detection score is satisfied and a not-driver-change when the change detection condition 154 related to the detection score is not satisfied.

At step S109, the processing circuitry may determine whether it is necessary to update the driver-specific anomaly detection model 134 or not based on an update condition. In step S109, when the processing circuitry determines that the update is included in response to the update condition being satisfied, the process may proceed to step S110.

At step S110, the processing circuitry may update the driver-specific anomaly detection model 134, the highlight extraction condition 152 and the change detection condition 154. In a preferable embodiment, there is a memory region where the peak threshold ($P_{thres}$) is stored. If the maximum value of the general anomaly scores ($A_g$) observed for the current input driving data is larger than a current value of the peak threshold ($P_{thres}$) stored in the memory region, the peak threshold ($P_{thres}$) is updated by simply replacing the value stored in the memory region by this new maximum value.

The change detection condition 154 may be updated by recalculating the detection scores for the driver-specific driving data stored in the driver-specific driving data store 132 using the updated driver-specific anomaly detection model 134.

If the processing circuitry determines that the update is not needed in step S109, the process may directly proceed to step S111.

At step S111, the processing circuitry may determine whether the process ends or not. If the processing circuitry determines that the process is not ended in step S111, the process may loop back to step S105 for a subsequent part of the input driving data. On the other hand, if the processing circuitry determines that the process is ended in step S111, the process may proceed to step S112 to end the process.

As described above, whether to update the driver-specific anomaly detection model 134 using the input driving data depends on the predetermined update condition. Retraining or updating of the driver-specific anomaly detection model 134 may be performed in a way of online learning or batch or offline learning. When online learning is employed, the update of the driver-specific anomaly detection model 134 may be performed each time a new part of the input driving data arrives until a driver change is detected. After the driver change is detected, the update of the driver-specific anomaly detection model 134 using a subsequent part of the input driving data may be invalidated. Alternatively, a determination as to whether or not to update the driver-specific anomaly detection model 134 using the input driving data may be done in a manner based on a determination result as to whether a driver change is detected for the input driving data as a complete episode after the completion of the episode (engine stop or start of long term parking) is detected.

There are several ways of handling the driver-specific anomaly detection model 134 in a manner depending on its application. In a first application (i), the driver-specific anomaly detection model 134 is fixed once the training of the driver-specific anomaly detection model 134 is completed. In a second application (ii), the driver-specific anomaly detection model 134 is updated using each new input driving data as long as no driver change is detected. In a third application (iii), the driver-specific anomaly detection model 134 is updated using each new input driving data regardless of whether the driver change is detected or not.

In the first and second applications (i) and (ii), a target driver in local environment is requested to perform driving of the automobile successively for at least a predetermined period or distance until the sufficient amount of the training data has been obtained. The driver-specific anomaly detection model 134 learns normal driving characteristics of the target driver. Thus, the judgement would be made as to whether or not the input driving data relates to driving by the target driver. In the second application (ii), driving characteristics of the target driver are continuously learned in the driver-specific anomaly detection model 134. Thus, changes in driving characteristics due to proficiency of driving skills of the target driver may also be reflected in the driver-specific anomaly detection model 134.

In the third application (iii), a first target driver (e.g., a certain person) in local environment is requested to perform the driving of the automobile successively for at least a predetermined period or distance. The driver-specific anomaly detection model 134 learns driving characteristics of the first target driver. Thus, at first the judgement would be made as to whether or not the input driving data relates to driving by the first target driver.

Even after learning of the driving characteristic of the first target driver is completed a second driver (e.g., a member of the family of the first target driver) would perform driving of the same automobile successively for a certain period or distance. In this case, the driver-specific anomaly detection model 134 may learn driving characteristics of the second target driver. Thus, the judgement would be made as to whether or not the input driving data relates to driving by the second target driver.

The driver-specific anomaly detection model 134 may lost its memory about the driving characteristics of the first target driver. However, after the first target driver again performs driving of the automobile successively for a certain period or distance, the judgement as to whether or not the input driving data relates to driving by the first target driver becomes possible again.

Furthermore, there is another way of handling the driver-specific anomaly detection model 134. In a fourth application (iv), a plurality of driver-specific anomaly detection models 134 is used for a plurality of target drivers while using each new input driving data in a manner depending on whether the driver change is detected or not.

In the fourth application (iv), a first target driver in local environment is requested to perform the driving of the automobile successively for at least a predetermined period or distance. At first, the judgement would be made as to whether or not the input driving data relates to driving by the first target driver. Even after learning of the driving characteristic of the first target driver is completed a second driver would perform driving of the same automobile. In this case, the system would recognize driver change. During the driving of the second driver, a new driver-specific anomaly detection model 134 is prepared and updated. The new model 134 may learn driving characteristics of the second target driver. Thus, the judgement would be made as to whether or not the input driving data relates to driving by the first target driver, the second target driver or drivers other than the first and second target driver by using the plurality of the driver-specific anomaly detection models 134. Each driver-specific anomaly detection model 134 may keep its memory about the driving characteristics of the corresponding target driver.

Figure 7:
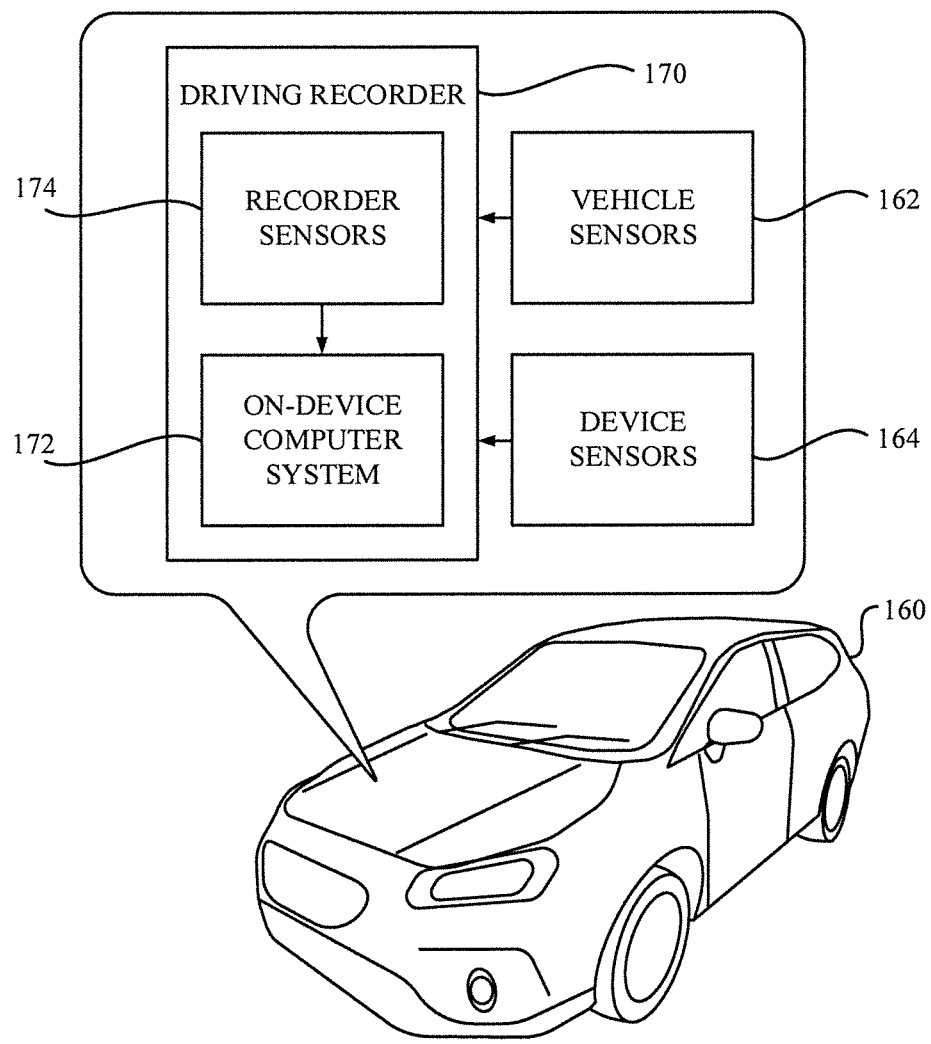
FIG. 7 describes a schematic of an automobile, in which the driver change detection system is implemented, according to a particular embodiment of the present invention.
Figure 8:
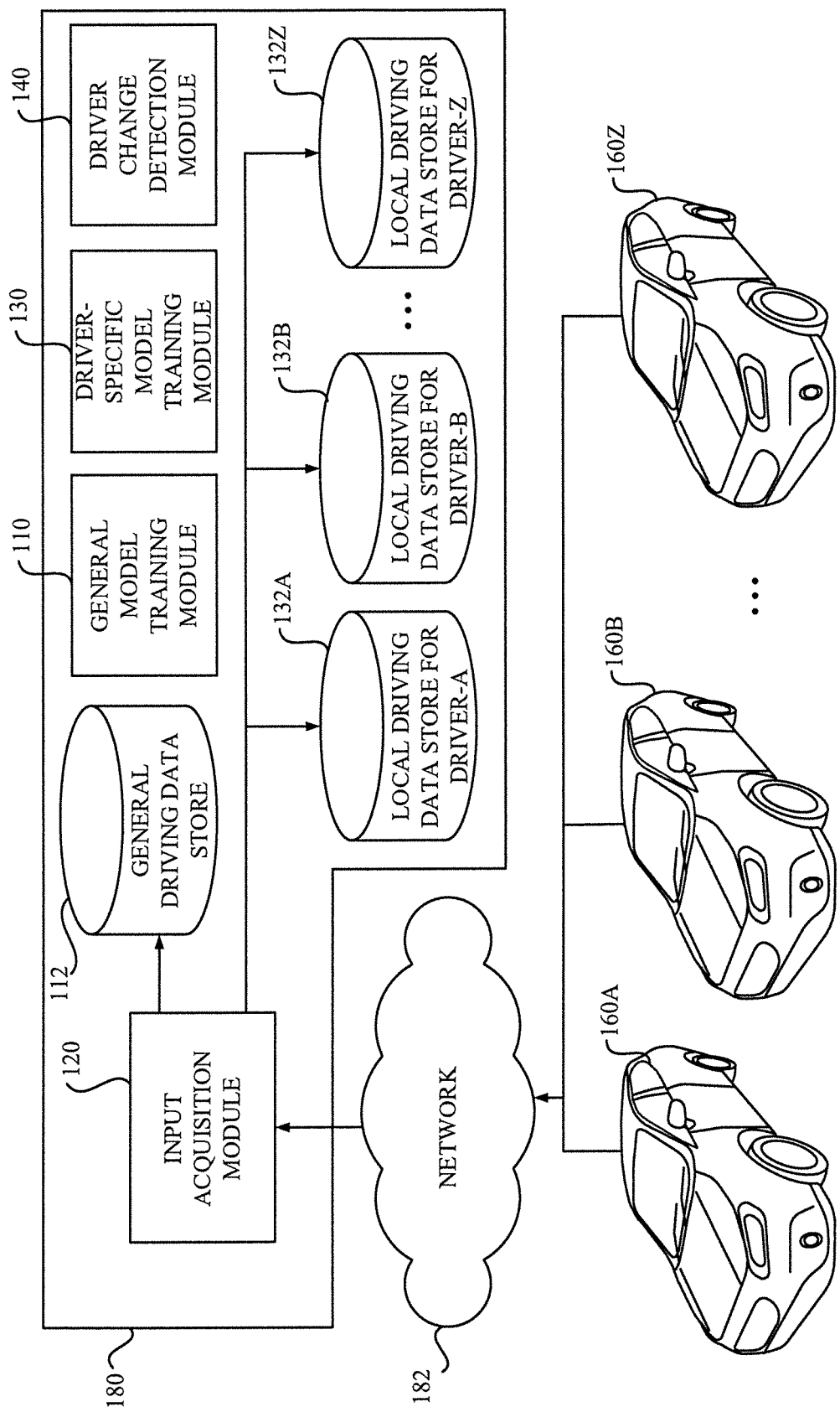
FIG. 8 describes a schematic of an automobile monitoring system for monitoring a plurality of automobiles, in which the driver change detection system is implemented, according to other particular embodiment of the present invention.

With reference to FIG. 7 and FIG. 8, schematics of an automobile and an automobile monitoring system, in which the driver change detection system 100 is implemented, according to one or more particular embodiments of the present invention are described.

FIG. 7 describes a schematic of an automobile 160, in which the driver change detection system 100 is implemented. The automobile 160 is equipped with a driving recorder 170; vehicle sensors 162 and device sensors 164. The vehicle sensors 162 may include any sensors equipped in the automobile 160 in relation to its vehicle control system. The device sensors 164 may include any sensors that are implemented in automotive equipment such as a car navigation system, ETC (Electronic toll collection) unit, etc., which are equipped in the automobile 160.

The driving recorder 170 may include recorder sensors 174, including any sensors implemented in the driving recorder 170 itself, and an on-device computer system 172 that implements at least the models 114, 134 and the modules 120, 130, 140 shown in FIG. 1.

The driving recorder 170 may acquire sensor signals originating from the recorder sensors 174, the vehicle sensors 162 and the device sensors 164. The sensors 102 shown in FIG. 1 may include any one of the recorder sensors 174, the vehicle sensors 162 and the device sensors 164.

In the particular embodiment shown in FIG. 7, major components of the driver change detection system 100 except for the general model training module 110 and the general driving data store 112 may be implemented in the automobile 160, as indicated by dashed line in FIG. 1. The general model training module 110 and the general driving data store 112 may be implemented in a central computational system at a side of vender.

Although the on-device computer system 172 that implements the major components of the driver change detection system 100 is described with reference to FIG. 7, however, computer systems for detecting a driving tendency is not limited to the aforementioned on-device computer system 172 of the driving recorder 170. The computer system may be an in-vehicle computer system of a vehicle control system of the automobile 160, an on-device computer system of other automotive equipment such as car navigation system and infotainment system, and a mobile computer system such as a smartphone and tablet computer that is brought into the automobile 160, to name but a few.

FIG. 8 describes a schematic of an automobile monitoring system 180, in which the driver change detection system 100 is implemented. As shown in FIG. 8, there is a plurality of automobiles 160A~160Z to be monitored by the automobile monitoring system 180. Each automobile 160 is configured to communicate with the automobile monitoring system 180 via a network 182 including a wireless network such as mobile network, a sensor network, etc. Each automobile 160 (or its equipment mounted thereon) transmits sensor signals that are acquired from the sensors equipped in the automobile 160 to the automobile monitoring system 180 via the network 182. A part of the driving data recorded with a predetermined recording frequency is transmitted to the automobile monitoring system 180 with a predetermined transmitting interval.

The input acquisition module 120 may collect the sensor signals from the plurality of the automobiles 160A~160Z and store the driving data into the general driving data store 112. The driving data collected in the general driving data store 112 is used by the general model training module 110 to train the general anomaly detection model 114. The general anomaly detection model 114 newly obtained would be used in the automobile monitoring system 180 to detect the driving tendency.

The input acquisition module 120 may also store each driving data into a corresponding local driving data store 132 for a corresponding driver according to the sender of the driving data (e.g., 132A for driver-A). The driving data stored in each local driving data store 132 is used by the driver-specific model training module 130 to train a driver-specific anomaly detection model 134 for the corresponding driver.

In the particular embodiment shown in FIG. 8, major components of the driver change detection system 100 except for the sensors 102 may be implemented in the automobile monitoring system 180, as indicated by dot line in FIG. 1. Each automobile 160A~160Z may have the sensors 102 and a transmitting device for transmitting the sensor data to the automobile monitoring system 180.

Although the automobile monitoring system 180 that implements the major components of the driver change detection system 100 and receives the sensor data from the plurality of the automobile 160 is described with reference to FIG. 8, however, computer systems for detecting a driving tendency is not limited to the aforementioned automobile monitoring system 180. The computer system may be any general computer system communicated with one or more automobiles through a network, or any general computer that has an access to a storage medium that stores input driving data, which may be removed from a storage media slot of the driving recorder, for example.

According to one or more embodiments of the present invention, a novel technique capable of detecting an operation tendency by using a plurality of anomaly detection models is provided.

The novel technique does not requires a camera (facial image) or other physical feature based biometric information and uses only recorded values from sensors that are generally available in a modern automobile or its standard equipment. The usage of recorded values of the sensors would make the detection possible with a low cost.

In a preferable embodiment where one or more highlight parts are extracted before calculating the detection score, even when the input operation data is very limited, which leads difficulty in recognizing difference between different drivers, it is possible to detect an operation tendency by placing emphasis on the information of the one or more highlight parts where individuality is expected to appear. The highlight extraction is expected to improve accuracy of the driver change detection.

Hereinabove, the computer-implemented methods, the computer systems and the computer program products for detecting an operation tendency has been described, in which the operation tendency to be detected is a driving tendency of an automobile that would indicate a driver change of the automobile and the operation data is a driving data. Although aforementioned features of the computer-implemented methods, the computer systems and the computer program products are preferable for detecting the driving tendency indicating the driver change of the automobile from the driving data since individuality appears in a way that the driver drives the automobile, especially, in a situation where maneuvers (e.g., left turns, right turns, braking, and the like) are performed.

However, the computer-implemented methods, the computer systems and the computer program products according to one or more embodiments of the present invention are not limited to the aforementioned driver change detection systems, processes and program products, any other driving tendency including state changes of a driver due to fatigue, drowsiness, flu, etc. are also expected to be detected since such factors would alter the driving characteristic of the driver to some extent.

Furthermore, the apparatus to be operated is not limited to the automobile (or a car), which is a wheeled motor vehicle. In other embodiments, any other self-propelled vehicles such as trucks (or lorries), buses, motorcycles (or two- or three-wheeled motor vehicle), heavy-duty vehicles (including heavy equipment), snowmobiles, watercraft, aircraft, etc. In further other embodiment, the apparatus to be operated may be a human-powered vehicle such as bicycles. In further other embodiment, the apparatus to be operated may not be limited to a vehicle, other types of apparatus that has a mechanism requiring a person to operate via an appropriate interface (e.g., a handle, a shift, a pedal, a lever, a dial, a knob, a switch, etc.) so as to control a motion related to the apparatus (e.g., apparatus itself, a part of the apparatus).

Having described the advantages obtained with respect to the one or more specific embodiments according to the present invention, it should be understood that some embodiments may not have these potential advantages and these potential advantages are not necessarily needed of all embodiments.

Computer Hardware Component

Figure 9:
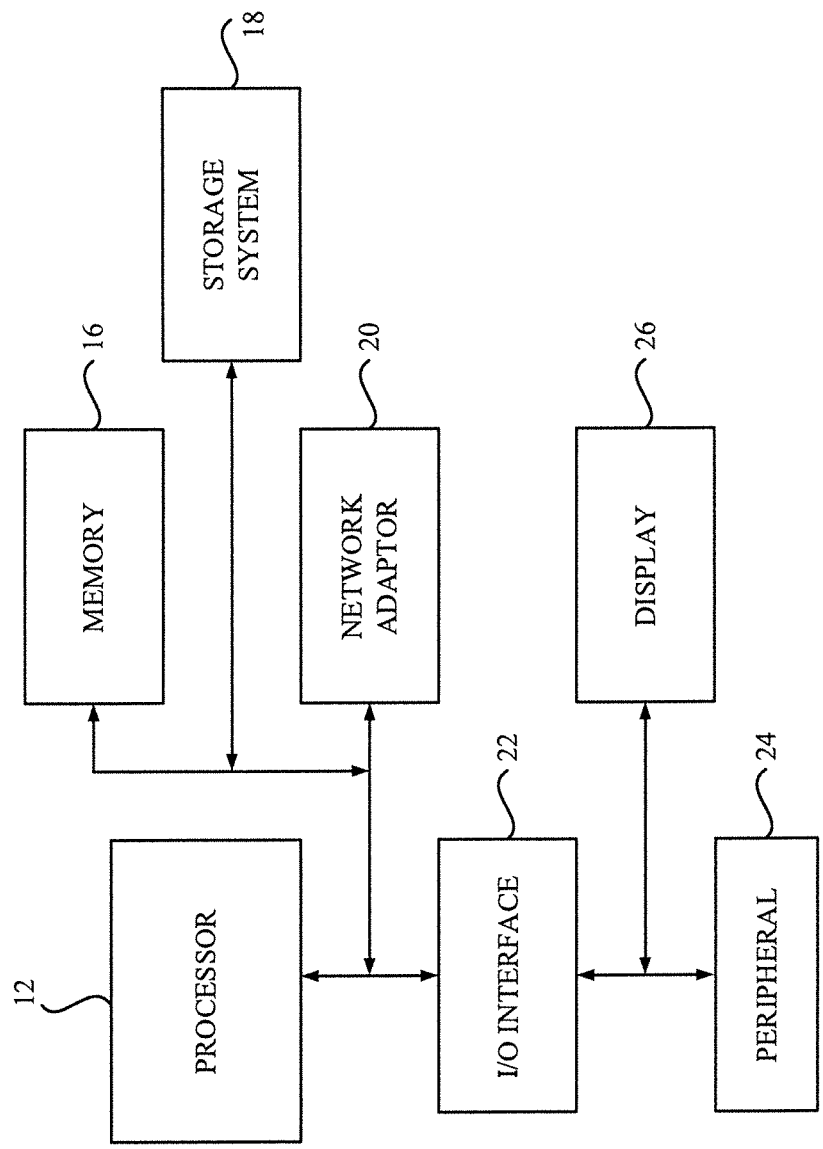
FIG. 9 depicts a computer system according to one or more embodiments of the present invention.

Referring now to FIG. 9, a schematic of an example of a computer system 10, which can be used for implementing the driver change detection system 100 (e.g., the on-device computer system 172, the automobile monitoring system 180), is shown. The computer system 10 shown in FIG. 9 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computer system 10 is shown in the form of a general-purpose computing device. The components of the computer system 10 may include, but are not limited to, a processor (or processing circuitry) 12 and a memory 16 coupled to the processor 12 by a bus including a memory bus or memory controller, and a processor or local bus using any of a variety of bus architectures.

The computer system 10 includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying, in real-time, a change in an operator of an apparatus based on a determined operation tendency of one or more target operators, the method comprising:
   preparing a general neural network model for generating a general anomaly score;
   preparing a specific neural network model of a same architecture as the general neural network model, for generating a specific anomaly score, by iteratively training and retraining an anomaly detection model with a set of a plurality of operation data related to operation by a target operator;
   collecting and transmitting input operation data, in real-time, using one or more sensors positioned on the apparatus during use of the apparatus, the sensors including at least one of an accelerometer, gyroscope, or steering angle sensor;

reducing required computational resources for in-vehicle devices by optimizing a simple binary classification mechanism based on a detection threshold (Stres) and utilizing a lower detection threshold setting for the anomaly detection, prioritizing speed of detecting and transmitting a notification over accuracy of detection;

identifying a change in an operator of the apparatus by calculating a detection score based on the operation tendency by using a general anomaly score and a specific anomaly score generated for the input operation data at a plurality of time steps during use of the apparatus; and outputting an alert indicating a new operator is using the apparatus responsive to a result of the calculating the detection score being higher than a detection threshold.

2. The method of claim 1, wherein the method further comprises:

extracting one or more highlight parts satisfying a highlight extraction condition related to the general anomaly score and/or the specific anomaly score from the input operation data, the general anomaly score and the specific anomaly score used to calculate the detection score being scores generated for the one or more highlight parts.

3. The method of claim 2, wherein the highlight extraction condition includes a condition for extracting a peak having magnitude more than a second threshold with respect to the general anomaly score and/or the specific anomaly score.

4. The method of claim 1, wherein the result indicates a change in the operation tendency in response to a tendency change detection condition related to the detection score being satisfied.

5. The method of claim 4, wherein the tendency change detection condition includes a first threshold with respect to the detection score, the first threshold being set in relation to a statistic of detection scores calculated for the set of the plurality of the operation data.

6. The method of claim 1, wherein the method comprises:

generating a sequence of general anomaly scores and a sequence of specific anomaly scores for the input operation data; and performing convolution of the sequence of the general anomaly scores and convolution of the sequence of the specific anomaly scores, the general anomaly score and the specific anomaly score being used in a form of the convolution to calculate the detection score.

7. The method of claim 1, wherein the operation tendency is a driving tendency of a vehicle and the target operator includes at least one individual driver and the result indicates a driver change for the input operation data.

8. The method of claim 1, wherein the method further comprising:

in response to an update condition being satisfied, updating the specific model using the input operation data.

9. The method of claim 8, wherein the specific model has been trained by using the set of the plurality of the operation data on a basis of the general model.

10. The method of claim 1, wherein each of the plurality of the operation data and the input operation data includes a sequence of vectors each including a plurality of recorded values selected from a group consisting of accelerations of x, y and z axes, angular velocities of roll, pitch and yaw axes, a vehicle speed, a steering angle, latitude, longitude, height, an azimuth, a depression amount and a depression speed of an accelerator pedal, a position of a throttle valve, a depression amount and a depression speed of a brake pedal, and processed values obtained therefrom.

11. The method of claim 1, wherein the general model and the specific model have architectures of a dynamic Boltzmann machine.

12. The method of claim 2, wherein the detection score is a ratio of a sum of one or more specific anomaly scores to a sum of one or more general anomaly scores generated for the one or more highlight parts.

13. A computer system for identifying, in real-time, an operator change of an apparatus based on a determined operation tendency of one or more target operators, by executing program instructions, the computer system comprising:

a memory tangibly storing the program instructions;
a processor in communications with the memory, the processor being configured for:

preparing a general neural network model for generating a general anomaly score;

preparing a specific neural network model of a same architecture as the general neural network model, for generating a specific anomaly score, by iteratively training and retraining an anomaly detection model with a set of a plurality of operation data related to operation by a target operator;

receiving input operation data, in real-time, collected and transmitted using one or more sensors positioned on the apparatus during use of the apparatus, the sensors including at least one of an accelerometer, gyroscope, or steering angle sensor;

reducing required computational resources for in-vehicle devices by optimizing a simple binary classification mechanism based on a detection threshold (Sthres) and utilizing a lower detection threshold setting for the anomaly detection, prioritizing speed of detecting and transmitting a notification over accuracy of detection;

identifying the operator change of the apparatus by calculating a detection score based on the operation tendency by using a general anomaly score and a specific anomaly score generated for the input operation data at a plurality of time steps during use of the apparatus; and outputting an alert result indicating a new operator is using the apparatus responsive to based on a result of the calculating the detection score being higher than a detection threshold.

14. The computer system of claim 13, wherein the processor is configured for:

extracting one or more highlight parts satisfying a highlight extraction condition related to the general anomaly score and/or the specific anomaly score from the input operation data, wherein the general anomaly score and the specific anomaly score used to calculate the detection score are scores generated for the one or more highlight parts.

15. The computer system of claim 13, wherein the result indicates a change in the operation tendency in response to a tendency change detection condition related to the detection score being satisfied.

16. The computer system of claim 13, wherein the operation tendency is a driving tendency and the target operator includes at least one individual driver and the result indicates a driver change for the input operation data.

17. The computer system of claim 13, wherein the computer system is selected from a group comprising an in-vehicle computer system; an on-device computer system of a driving recorder; a mobile computer system brought into a vehicle; a general computer communicated with a vehicle through a network, and a general computer having an access to a storage medium for storing the input operation data.

18. A computer program product for identifying, in real-time, an operator change of an apparatus based on detecting a determined operation tendency of one or more target operators, the computer program product comprising a computer readable storage medium having program instructions embodied therewith, the program instructions executable by a computer to cause the computer to perform a computer-implemented method comprising:

preparing a general neural network model for generating a general anomaly score;

preparing a specific neural network model of a same architecture as the general neural network model, for generating a specific anomaly score, by iteratively training and retraining an anomaly detection model with a set of a plurality of operation data related to operation by a target operator;

collecting and transmitting input operation data, in real-time, using one or more sensors positioned on the apparatus during use of the apparatus, the sensors including at least one of an accelerometer, gyroscope, or steering angle sensor;

reducing required computational resources for in-vehicle devices by optimizing a simple binary classification mechanism based on a detection threshold (Sthres) and utilizing a lower detection threshold setting for the anomaly detection, prioritizing speed of detecting and transmitting a notification over accuracy of detection;

identifying a change in an operator of the apparatus by calculating a detection score related to based on the operation tendency by using a general anomaly score and a specific anomaly score generated for the input operation data at a plurality of time steps during use of the apparatus; and outputting an alert result indicating a new operator is using the apparatus responsive to based on a result of the calculating the detection score being higher than a detection threshold.

19. The computer program product of claim 18, wherein the method further comprises:

extracting one or more highlight parts satisfying a highlight extraction condition related to the general anomaly score and/or the specific anomaly score from the input operation data, the general anomaly score and the specific anomaly score used to calculate the detection score being scores generated for the one or more highlight parts.

20. The computer program product of claim 18, wherein the result indicates a change in the operation tendency in response to a tendency change detection condition related to the detection score being satisfied.

* * * * *